United States Patent [19]
Barbier et al.

[11] Patent Number: 5,142,527
[45] Date of Patent: Aug. 25, 1992

[54] VOICE MESSAGE EQUIPMENT FOR AN AUTOMATIC EXCHANGE

[75] Inventors: Nathalie Barbier, Sartrouville; Roger Cartret, Franconville; Jean-Claude Hoyami, Paris; Gérald Le Cucq, Maule, all of France

[73] Assignee: Alcatel Business Systems, Paris, France

[21] Appl. No.: 540,736

[22] Filed: Jun. 20, 1990

[30] Foreign Application Priority Data

Jun. 20, 1989 [FR] France .................. 89 08188

[51] Int. Cl.⁵ ................ H04Q 11/04; H04M 1/64
[52] U.S. Cl. ...................... 370/62; 379/88; 379/89
[58] Field of Search .............. 370/62, 58.1, 29; 379/67, 68, 74, 75, 88, 89

[56] References Cited

U.S. PATENT DOCUMENTS

| | | | |
|---|---|---|---|
| 4,612,416 | 9/1986 | Emerson et al. | 379/88 |
| 4,640,991 | 2/1987 | Matthews et al. | 379/88 |
| 4,785,473 | 11/1988 | Pfeiffer et al. | 379/89 |
| 4,791,660 | 12/1988 | Oye et al. | 379/88 |
| 4,817,086 | 3/1989 | Oye et al. | 379/88 |
| 4,837,804 | 6/1989 | Akita | 379/88 |
| 4,853,952 | 8/1989 | Jachmann et al. | 379/88 |

OTHER PUBLICATIONS

Review of the Electrical Communication Laboratories, vol. 32, No. 6, Nov. 1984, pp. 1010-1018; I. Nishikado et al.: "Voice Storage System".
Review of the Electrical Communication Laboratories, vol. 32, No. 6, Nov. 1984, pp. 1003-1009; M. Ohyama et al.: "Voice Storage Equipment".
N.E.C. Research and Development, No. 84, Jan. 1987, pp. 39-46; M. Nishio et al.: "Distributed Processing Architecture for APEX/NEAX2400 VMM (Voice Mail Module)".

Primary Examiner—Douglas W. Olms
Assistant Examiner—H. Kizou
Attorney, Agent, or Firm—Sughrue, Mion, Zinn, Macpeak & Seas

[57] ABSTRACT

The equipment includes a recorder (17) provided with at least one memory disk unit (32) for recording messages and for deferred retransmission thereof. The equipment includes circuitry (18, 22) for putting a plurality of telephone sets into communication simultaneously with a single disk controller (33) of the recorder for transmitting messages simultaneously both from the telephone sets and from the disk unit. The invention is particularly suitable for private branch exchanges.

9 Claims, 3 Drawing Sheets

VOICE MESSAGE EQUIPMENT FOR AN AUTOMATIC EXCHANGE

BACKGROUND OF THE INVENTION

The invention relates to voice message equipments for automatic exchanges, in particular those capable of offering a so-called "letterbox" service to the users of telephone sets connected to a digital time division exchange.

Voice message services are designed to allow the users of telephone sets to receive sound type messages over the telephone and to record them for subsequent consultation without having to answer calls when they are actually happening.

These services sometimes also enable the same users to transmit recorded telephone messages, which may may be personalized or otherwise, e.g. by broadcasts at selected times to specified called parties or to parties calling over the telephone system.

It is possible to provide such such services by individual telephone answering machine type equipments integrated in telephone terminals or sets, or located close by and connected thereto, but it is advantageous for such services to be provided by the exchanges to which the telephone terminals or sets are connected, with a set then having the option of being associated with an individual or shared "letterbox" both for receiving and for sending user messages.

This second technique enables nearly all of the hardware and software required to operate the system to be centralized in an exchange, while the telephone sets require few or no additions to be capable of operating the message service.

The voice message equipment of an exchange must therefore be capable of receiving and recording a plurality of messages simultaneously for the telephones which are connected thereto. This can be achieved, for example, by connecting the voice message equipment to the switching network of the exchange via at least one time division multiplex link over which messages received simultaneously are time multiplexed. All that is then required is a memory arrangement whose recording speed and capacity are compatible respectively with the bit rate and the volume of sampled speech signals transmitted over the multiplex link(s).

The voice message equipment of an exchange must also be capable of reconstituting any message intended for a telephone in real time and at a user's request, regardless of the total number of messages recorded and regardless of how old the message may be relative to the collection of messages simultaneously still in store.

This implies using very large capacity memories having short access times. For reasons of economy, it is known that hard disks may be used since they have large capacity and relatively short access time.

SUMMARY OF THE INVENTION

One of the present objects then consists in finding a structure for message equipment and a method of operating it giving rise to a reliable and efficient implementation which is cheaper for any given telephone installation than fitting the telephone sets with individual telephone answering machines.

The present invention therefore provides a voice message equipment for telephone sets connected to an automatic exchange including a switching network for putting said sets into communication with one another and possibly with other telephone sets connected to other exchanges in a network having exchanges interconnected by telephone lines, said equipment being intended to enable telephone sets to put into communication with one another in a deferred manner via the switching network by means of a recorder included in said equipment and provided with at least one memory disk unit for recording messages for deferred transmission.

According to a characteristic of the invention, the voice message equipment includes means for putting a plurality of different telephone sets simultaneously into communication with a disk controller of the recorder for simultaneously transmitting messages both from the telephone sets and from at least one disk unit, said means being suitable firstly for cyclically compacting a determined number of speech samples transmitted successively in a given time interval "T" by a time slot of a multiplex link via which the switching network has access to the equipment, into a corresponding group of granule samples, and for transmitting said group as a block within a time shorter than the group formation time after it has itself been formed and between other groups coming either from other time slots of the link or from a disk unit being retransmitted via the disk controller, and secondly decompacting each group as retransmitted by the disk controller into a succession of speech samples and transmitting such a succession over a time slot of the multiplex link to a telephone set via the switching network.

BRIEF DESCRIPTION OF THE DRAWINGS

The invention, its characteristics and its advantages are described in greater detail in the following description with reference to the figures listed below, in which.

DETAILED DESCRIPTION OF THE INVENTION

Figure 1:
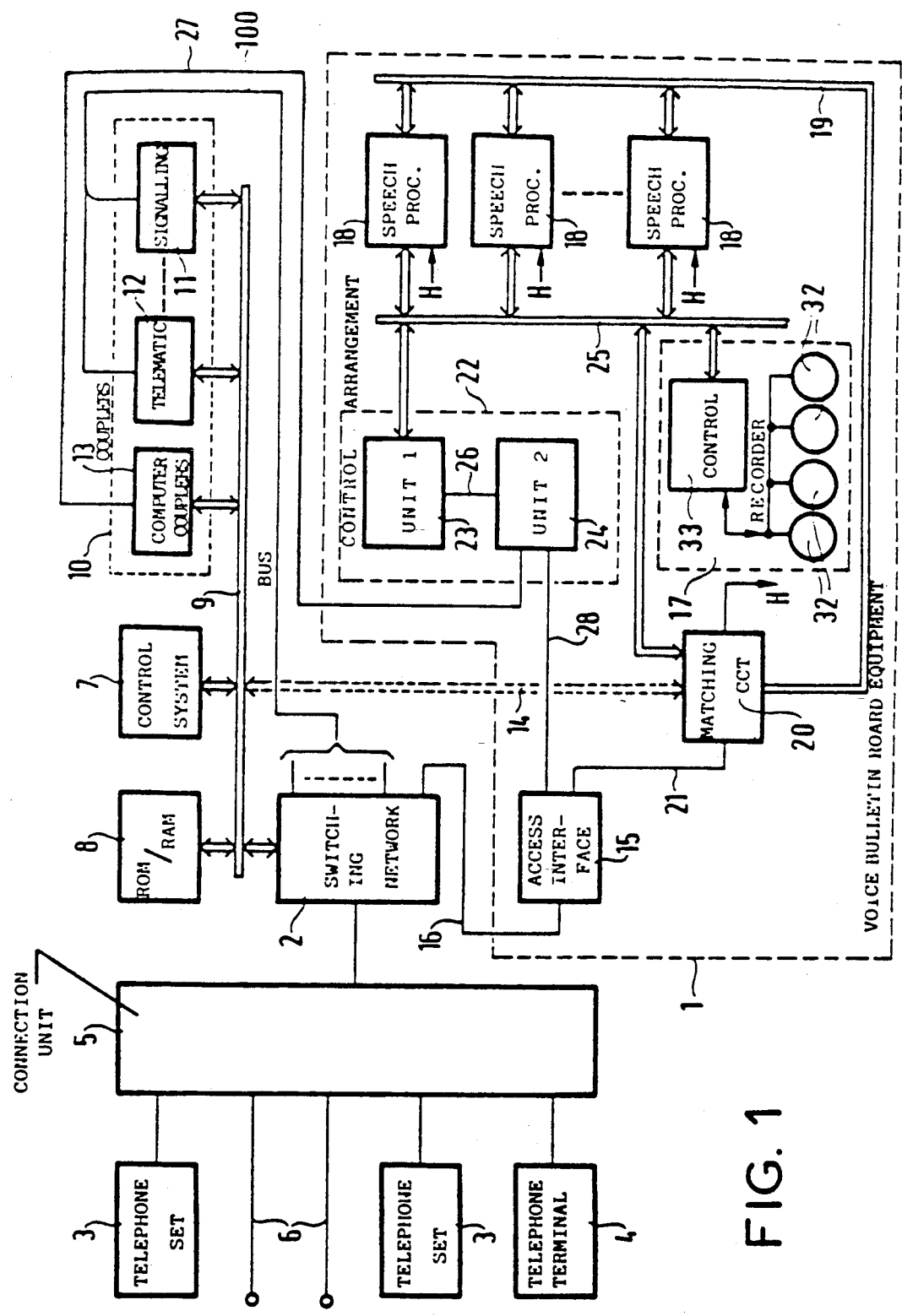
FIG. 1 is a block diagram of an exchange provided with voice message equipment of the invention.

The voice message equipment 1 shown in FIG. 1 is intended to be associated with an automatic telephone exchange to provide a letterbox service for sound messages, usually voice messages, for the users of telephone sets connected to the exchange.

The exchange used as an example in this case is a multi-service digital time division exchange of the type described in the article entitled (in translation) "OPUS 4000 multiservice exchange", published in 1985 in issue No. 4 of the journal "Commutation et Transmission".

In a conventional manner, such an exchange comprises a switching network 2 having telephone sets 3, 4 connected thereto, the switching network being suitable for connecting the telephone sets, on request, either to one another or else to other telephone sets connected to other exchanges to which the switching network 2 has access.

In the embodiment shown, the telephone sets 3, 4 are interfaced to the switching network 2 of their exchange via connection units 5, with inter-exchange telephone links 6 also being terminated on such units 5.

The telephone sets 3, 4 include, for example, simple telephone sets 3, and telephone terminals 4 including additional facilities, e.g. for displaying and/or processing data. Either type of telephone may be analog or digital and the characteristic they have in common is the ability to send and receive sound signals in the telephone frequency band.

All of them are capable of converting sound waves into signals suitable for transmission to the exchange via an electrical, radio, or optical link. Sampling and encoding are performed prior to the application of electrical signals to the voice message equipment 1, with the sampling and encoding taking place at any suitable point along the path connecting a telephone to the corresponding voice message equipment via the switching network 2 of the exchange including said equipment.

The telephone links 6 connecting the exchange in question to other exchanges may be conventional time divided multiplex wire links or they may possibly be simple analog wire links. The signals that they apply to the voice message equipment 1 are sampled and encoded at some suitably selected point on the path connecting the sending telephone set to said equipment.

In a conventional manner, the exchange including the voice message equipment 1 has a control system 7 comprising at least one processor and memory (RAM and ROM) 8 interconnected by a bus structure 9 which also serves for controlling the switching network 2 and for providing communication between the control system and the exchange equipment via a bank of couplers 10.

These couplers include, for example, signaling couplers 11 for interchanging signaling between the control system of the exchange and the environment to which the exchange is connected, in particular the telephones connected thereto and other exchanges.

There are also telematic couplers 12 enabling data or voice signals to be interchanged, in particular between telephones via the switching network and the telephone links.

There are also computer couplers 13 enabling the control system to be connected to various computer equipments such as hard disks or tape type memories, teleprinters, and printers. These computer couplers 13 are conventionally provided with standardized ports, e.g. in compliance with CCITT standard V24.

The signaling couplers 11 and the telematic couplers 12 are connected to ports of the switching network 2 via one or more time divided multiplex links 100 for performing the interchange functions they are required to perform.

The voice message equipment 1 is connected over at least one time division multiplex linik to the exchange of which it forms a part. This connection takes place, for example, via the bus structure 9 of the exchange, which bus structure then includes an internal time division multiplex link 14 which in this case has thirty-two time slots providing a bit rate of 2.048 Mbit/s for transferring PCM samples which in this case are encoded using a μ law.

Alternatively, this connection could be provided via a port of the switching network 2 using a standardized individual time division multiplex link 16 in which only thirty time slots are usable for transmitting samples.

An access interface 15 recovers the clock signals transmitted over the link 16 and separates or combines signaling slot bytes and speech slot bytes passing between the switching network 2 and the voice message equipment over said link 16.

Speech signals sent by the telephone sets 3, and by the telephone links 6 to the voice message equipment are transmitted for the purpose of being stored by a telephone message recording and playback machine ("recorder") 17, which is suitable both for storing messages constituted by such speech signals that have been sampled and encoded, and for subsequently playing them back in the same form on request.

The recorder 17 is constituted in this case by one or more large capacity magnetic disk units 32 which communicate with the telephone sets 3 and the telephone lines 6, said units being accessible via a controller 33.

The recorder 17 is connected to a plurality of speech processing circuits 18. These circuits are connected in parallel to a time multiplex link 19 serving as an internal bus. This multiplex link 19 is connected via a matching circuit 20 either to the link 14 or else to a link 21 leading to the port of the access interface 15 via which speech path bytes pass after being separated from signaling path bytes.

Each speech processing circuit 18 is designed to prepare for storage a message whose PCM samples are transmitted successively over the same time slot of the time division multiplex link 19 for the duration of a call during which the speech processing circuit 18 in question and a telephone set 3, 4 are interconnected over the switching network 2.

Each speech processing circuit 18 is also suitable for reconstituting a message to be sent to a telephone set 3, 4 on the basis of recordings made by the recorder 17 while a message was being received, and to retransmit the reconstituted message to the intended telephone set in the form of PCM samples on one of the time slots of the time division multiplex link 19.

The PCM samples transmitted over the multiplexed link 19 pass via the matching circuit 20 which operates in conventional manner to provide such electrical matching and electrical isolation as may be required between the link 19 and the link 21 or 14.

In the embodiment described, the matching circuit 20 also extracts clock signals and synchronization signals for the voice message equipment 1 from the signals received over one or other of the links 14 and 21. The corresponding extracted signals are transmitted to the various circuits concerned in the equipment, and in particular to the speech processing circuits 18 via a set of links symbolized by the letter H in FIG. 1.

The operation of the voice message equipment 1 is supervised by a first programmed control arrangement 22 which, in this case, is accessible for control purposes via a downloading link and/or via a teletype connection, and/or via a floppy disk drive (not shown). The control arrangement 22 may also be programmed by means of a REPROM type memory incorporated therein.

In the embodiment described, the control arrangement 22 is organized around two programmed control units 23, 24 performing complementary tasks, each unit being organized around a processor, e.g. taken from the 68000 series made by the firm Motorola, and associated with memories and auxiliary circuits.

The "managing" control unit 23 is more specifically concerned with storing and reconstituting messages by means of the recorder 17 to which it has access via a bus 25 to which the speech processing circuits 18 also have access in order to pass the messages. The "application" control unit 23 is programmed to allocate the bus link 25 to the speech processing circuits and to the recorder 17 as a function of their mutual access requirements, said circuits and said reader being slaved thereto.

The bus 25 also serves the matching circuit 20 in particular so as to enable internal looping via said matching circuit while performing send and receive tests to or from the recorder 17 via the speech processing circuits 18.

Control unit 24 is more specifically concerned with operating the voice message application and takes account of requests for recording and playing back messages. To this end, control unit 24 (which is provided with programs corresponding to tasks related to the above-mentioned account-taking operations) includes a backed up memory in which it stores information relating to the letterboxes individually associated with approved users for their messages.

The information includes data relating to characteristics specific to each letterbox, in particular who it belongs to, its size, and characteristics relating to its contents, in particular whether it contains any recorded messages, the number of messages received, the identification thereof, etc. . . . . .

In the embodiment described, the two control units 23 and 24 communicate with each other via a link 26. Naturally, the two control units could be constituted by a single unit which would be cheaper, and appropriate for a low capacity installation.

Similarly, in a variant, the control unit 24 may be integrated in the assembly comprising the control system 7 and its memories 8.

In the embodiment shown, the control unit 24 is connected by link 27 to a computer coupler 13 (in this case of the V24 type) for interchanging signaling with the exchange.

The link 27 enables the control unit 24 to receive and send telephone signaling over the coupler 13, e.g. when a call is being set up from a telephone set while the matching circuit 20 is connected to the PCM type synchronous time division multiplex link 14 of the bus structure 9 for interchanging speech samples relating to the messages transmitted.

As a result, telephone signals sent by a telephone set to the voice message equipment over the switching network 2 is transmitted to the control unit 24 by the exchange control system 7 which itself receives the signaling via a signaling coupler 11 connected to the network, which then retransmits it via the coupler 13.

In the other embodiment proposed, the link 28 between the access interface 15 and the control unit 24 enables the control unit 24 to receive and send telephone signaling bytes via said access interface 15 while said interface is transmitting speech samples over the matching circuit 20 relating to the messages transmitted over the link 16. This applies both to interchanging signaling with the control system 7 itself, and with local or remote telephone sets.

Figure 2:
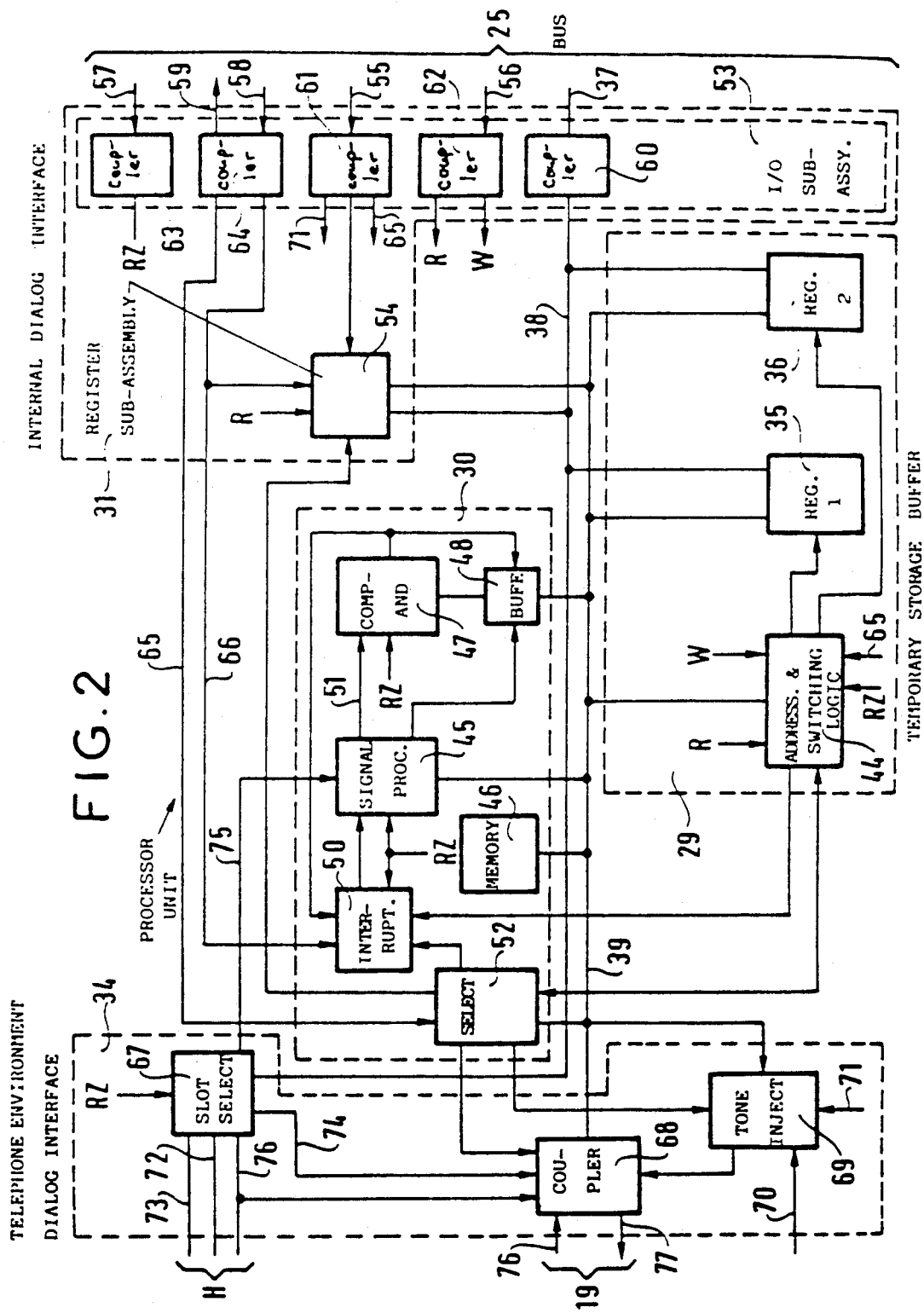
FIG. 2 is a block diagram of a speech processing card in accordance with the invention.

A speech processing circuit 18 in accordance with the invention is shown in FIG. 2 and it serves as an interface between the recorder 17 and the telephone environment in which it is found. The speech processing circuit operates under combined supervision of the control system 7 with respect to its links with the telephone environment, and of the control arrangement 22 with respect to its link with the recorder 17. The synchronization and clock signals required for its operation with the telephone environment are provided thereto by the link H, thereby enabling it to receive and to send over one of the two-way time slots of the multiplex link 19. The allocation of a time slot to a speech processing circuit 18 for the duration of a message to be recorded or played back is under the control of the control system 7. Speech processing circuit selection is performed by the control unit 24 which is informed of a user request as transmitted thereto by the control system 7.

However, the control unit 23 in association with the disk controller 33 manages communication between each of the speech processing circuits 18 and the recorder 17 via the bus 25 and for each given message.

The facility of transmitting messages simultaneously over separate time slots of the multiplex link 19 and consequently over a corresponding number of speech processing circuits 18, means that utilization of the recorder 17 and of the bus 25 by the speech processing circuits must be time shared. For reasons relating to recording and playback conditions applicable to the disk units 32, each message is broken up into successive same-duration lengths called "granules". The speech sample bytes in a granule are compressed in order to reduce the amount of memory required for recording them on a disk unit 32.

The bytes obtained after compression for each of the successive granules of a message are transmitted in time D to the recorder 17 by the appropriate speech processing circuit 18, where granule transmission time D is fixed. Similarly, the recorder 17 plays back each message granule by granule with a maximum time interval between groups of successive granule bytes that must remain less than D.

The various speech processing circuits 18 that are active simultaneously therefore share the bus 25 with the recorder 17 for their respective byte-sending activities under the authority of the control unit 23 in such a manner as to satisfy the above-mentioned time requirements, while the transmission gaps between the groups of bytes in successive granules in the same message may vary over time.

Consequently, each speech processing circuit includes a temporary storage unit 29 for message bytes to be recorded or played back, a processor unit 30 for manipulating bytes, and two dialog interfaces 31 and 34 for sharing the interchange burden, one communicating with the control arrangement 22 and the recorder 17, and the other with the telephone environment.

In this case, the storage unit 29 comprises two storage registers 35 and 36 suitable for containing bytes received from the multiplex link 19 or for transmitting bytes thereto over a time interval D. These registers are operated simultaneously so that one of them is being read from while the other is being written to, both during message recording stages and during playback stages.

In the embodiment shown, each storage register 35 and 36 communicates firstly with a two-way data transmission link 37 of the bus link 25 via a first internal link 38 (a multiwire link in this case), and secondly with the multiplex link 19 via a second internal link 39, and in both cases the register is connected to each of these internal links via an access coupler (not shown). The access couplers are individually controlled by addressing and switching logic 44 as a function of storage or playback requirements, said logic also triggering writing and reading within the storage registers under the control either of the control arrangement 22 or else of the processor unit 30.

The processor unit 30 comprises a controlling processor 45 for separating multifrequency signaling samples that may be received over the multiplex link 19 during message transmission from the speech samples relating to the same message. Only the speech samples are to be stored by the recorder 17.

The control processor 45 is constituted, in this case, by a signal processor, e.g. of the TMS 320C20 type manufactured by the firm Texas Instruments. There is also a gain controller which automatically ensures that the speech samples received from the multiplex link 19 are at a level appropriate for optimum recording by the recorder and to ensure that they are subsequently played audibly, regardless of the variation in level and silence that may occur while the sound signals are being picked up by the origination telephone sets. The control processor 45 is connected for this purpose to the addressing and switching logic 44 and to a memory unit 46 which is associated therewith by an internal link 39.

A companding processor 47 is associated with the control processor 45 in each speech processing circuit for the purpose of compressing messages to be recorded which are received in the form of time multiplexed samples over a time slot of the multiplex link 19 and for decompressing messages which are played back in the form of granule groups of bytes over the bus 25.

To this end, the companding processor 47 is connected by a port to a buffer circuit 48 which gives it access to the storage unit 29 via the internal link 39.

The buffer circuit 48 is controlled on a shared basis both by the control processor and by the companding processor which may both be processors of the same type, the control processor governing the transfers of bytes to be compressed to the buffer circuit from one or other of the registers 35 and 36 in the storage unit and the return of bytes to said unit after they have been compressed.

The compander processor reads bytes to be compressed as written in the buffer circuit 48 and returns those bytes in compressed form.

The presence of compressed bytes to be transferred from the buffer circuit 48 to the storage unit 29 is indicated by the compander processor 47 to the control processor 45 via an interrupt circuit 50 which acts on an appropriate input of the control processor. The control processor is also suitable for transmitting an interrupt request to the companding processor over a link 51.

The interrupt circuit 50 centralizes interrupt requests to the controlling processor 45, in particular requests from the control unit 23, from the addressing and switching logic 44, and from the companding processor 47. The control processor 45 informs the interrupt circuit 50 each time it has taken an interrupt into account. This is done by means of a selector 52 which also serves as the control interface of the control processor, in particular with respect to the logic circuit 44 for controlling the storage registers 35 and 36, the couplers associated therewith and members defined below in the dialog interfaces 31 and 34.

An input/output subassembly 53 is associated with a register subassembly 54 in the dialog interface 31 connecting the temporary storage unit 29 and the processor unit 30 of a speech processing circuit to the bus 25 to which the circuit is connected.

Each input/output subassembly 53 serves in conventional manner to transmit data between the members served thereby and also provides separation in particular enabling the bus 25 to continue functioning even in the event of a failure of the speech processing circuit of which the subassembly forms a part.

In the example described, the input/output assembly 53 is connected to various links constituting the bus 25, and in particular to the multiwire data transmission link 37, to the multiwire addressing link 55, to the read/write control link 56, to a reset to zero link 57 from the control unit 23, and to two opposite-direction interrupt links 58, 59, one going from the processor unit 30 of the circuit and the other going from the control unit 23.

The internal link 23 and the data transmission link 37 are interconnected by a conventional three-state type two-way coupler 60. More or less elaborate couplers 61 to 64 provide interfaces between the various links 55 to 59 and the members of the speech processing circuit which each of them serves. The control unit 23 controls the selector type coupler 61 in particular to act on the logic circuit via a link 65 and on the register subassembly 54. Via control lines R and W acting on the logic circuit 44, the coupler 62 enables the control unit 23 to read or write, in particular in the temporary storage unit 29. The coupler 63 enables the members of the speech processing circuit to be reset to zero via a link RZ by the control unit 23 and/or by the processor unit 30.

The coupler 64 provides controlled transmission of interrupt requests from the control processor 45 to the control unit 23 via the selector 52 and the link 65, and opposite direction transmission of interrupt requests from the control unit via the link 58 and a link 66 terminating on the interrupt circuit 50 and on the register subassembly 54. The register subassembly is operated simultaneously by the control processor 45 and by the control unit 23 with respect to their mutual activities. In this case, the subassembly 54 includes a state register, a control register, and an interrupt register (not shown individually), and it is connected to internal links 38 and 39, one of which is accessible to the control processor and the other to the control unit, and it receives specific control signals from the control processor via the selector 52 and from the control unit via the coupler 61, 62, and 64.

The state register is loaded by the control processor for reading by the control unit 23, the control register and the interrupt register are loaded by the control unit and they are read by the control processor.

The dialog interface 34 connecting a speech processing circuit 18 to its telephone environment essentially comprises a time slot selector circuit 67 connected to the links 4 of the matching circuit 20 of the voice message equipment 1, and a two-way coupler 68 connecting the internal link 39 of the speech processing circuit to incoming link 76 and to outgoing link 77 of time division multiplex 19. A tone injector circuit 69 is associated in this case with the circuits 67 and 68 in order to enable tones to be produced to be heard by users and as a function of requirements during message recording, with the tones being taken from a tone generator (not shown). The tone generator may be external to the message equipment and may be connected to the tone injector circuit by a link 70.

Control of the injector circuit is shared between the control processor 45 and the control unit 23, and it is connected to them respectively via the selector 51 and via link 38.

The injector circuit 65 sends tones to users via the two-way coupler 68 on the time slot of the outgoing link 77 allocated to its speech processing circuit for the duration of the current call.

In this case, the coupler 68 provides serial-parallel conversion of the speech sample bits transmitted by the link 19 to the speech processing circuit in which it is contained, and it also synchronizes the sample bits transmitted to the link 19 after putting them into serial form. It is controlled by the controller processor 45 via the selector 52, and it is triggered at a rate fixed by the clock signals governing the multiplex links of the exchange in which it is contained, said signals being provided thereto by a link 71.

The time slot selector 67 is controlled by the control system 7 of the exchange via link H, it receives clock signals via link 71, synchronization signals for the time division multiplex links via a link 72 and time slot allocation for a given call via a link 73. A link 74 enables the time slot selector 67 to provide the coupler 68 with a signal enabling the coupler to send and receive over the multiplex link 19 in the time slot allocated to the speech processor circuit which contains it. Information concerning this allocated time slot is transmitted to the control processor via a link 75.

Following the description of the various members required by the invention in a speech processing circuit, operation of the message equipment of the invention is described below.

In the intended embodiment, access to the recorder is of the sequential type, with only one speech processing circuit being intended to be in communication with the recorder 17 at any given instant.

Each of the active speech circuits accesses the recorder successively via the bus link under the control of the control arrangement 22.

Because of contraints related to the way disk units operate, if it is desired to make optimum use of the slowest devices in the assembly constituted by the disk units 32 of the reader, it is undesirable to establish communication between the speech processing circuits 18 and the recorder 17 sample by sample as is done for communications with the switching network passing via the matching circuit 20.

A message is recorded in the recorder 17 in broken-up form in order to share access times between the recorder 17 and the various active speech processing circuits 18 whenever messages are being received simultaneously via the speech processing circuits and/or transmitted from the recorder to the speech processing circuits. The successive granules of the same message are then separated on recording in the recorder by other granules coming from other messages received simultaneously by the voice message equipment 1.

In the example described, each granule corresponds to two seconds of the initial message and the speech samples making it up are stored temporarily in the speech processing circuit 18 while the message is being recorded.

As mentioned above, any message transmitted to the voice message equipment 1 is examined to see whether it contains any multifrequency signaling for the equipment, with this being done by the control processor 45.

The control processor is connected to an incoming link 76 via the coupler 68, and it sets the level of messages received over this incoming link using a method that is not described herein insofar as it is only indirectly related to the invention.

Any multifrequency signaling byte transmitted by the incoming link 76 is taken into account by the control processor 45 which analyzes it firstly to make use of it and secondly to avoid storing it in the record 17 and consequently to prevent any such signaling byte causing interference on retransmission from the recorder.

The bytes received by the control processor 45 are applied successively to the companding processor 47 which is used for compressing message signals.

In the example described, the compression is of the conventional MICDA type in compliance with CCITT recommendation G721, with the compression program being stored in the integrated circuit of the companding processor 47 which is masked. The companding processor 47 also provides the expansion or "decompression" required for restoring the samples of a message that has previously been recorded in compressed form in the recorder.

The samples transmitted for compression by the control processor 45 to the companding processor 47 transit through the buffer register 48 which is controlled by these processors in turn, after which the bytes are stored temporarily.

A message is stored granule by granule in the speech processor circuit which is processing the message during recording, with the compressed speech samples of successive granules being stored on a granule-by-granule basis alternately in one and the other of the temporary storage registers 35 and 36 under the control of the control processor 45 acting via the addressing logic 44.

The multifrequency signaling bytes that may be received during a message are stored like speech samples in the temporary registers 35 and 36 during a lapse of time which is designed to enable the control processor to recognize such signaling, using conventional programming. They are not forwarded to the recorder 17, unlike speech samples which are transmitted granule by granule via the two-way coupler 60 and the data link 37.

This transmission of speech samples in granules to the recorder 17 takes place under the control of the control unit 23 and via the bus 25.

In conventional manner, one of the temporary storage registers 35 and 36 is used to receive while the other one is being used to transmit, both while a message is being recorded in the voice message equipment 1 via the speech processing circuit containing said registers and while a message is being played back from the recorder 17.

As mentioned above, communication between the temporary storage registers 35 and 36 of the various speech processing circuits and the recorder 17 is coordinated by the control unit 23 both while recording the compressed speech samples of the granules and while playing them back.

In the embodiment described, the control unit 23 addresses each of the speech processing circuits cyclically via the interrupt link 58, with each addressing authorizing the transmission of any pending interrupt request from the control processor 45 to the control unit 23 via the interrupt link 59.

Such an interrupt request is generated by each control processor 45 for each of the occasions that the speech processing card containing the processor communicates with the control unit 23, and in particular for each transmission of a one-granule block of compressed speech samples.

Interrupt requests made by the control processors 45 of active speech processing cards 18 are taken into account by an interrupt controller in the control unit 23. Insofar as each speech processing circuit in communication is required to store speech samples granule by granule, and given that transmission over the multiplex bus link 19 takes place in real time, it is essential for each active speech processing circuit to be given access periodically to the recorder 17 during the minimum length of time required for transmitting the compressed speech samples of one granule over a period of time no greater than the predetermined duration "T" selected for one granule, i.e. two seconds in the present case.

In the embodiment described, it is necessary to obtain sixteen accesses to the recorder 17 for the speech processing circuits and one maintenance access if necessary, during a period of time which is no greater than the duration of one granule, and these accesses occupy time that cannot be determined in advance.

The control unit 23 is therefore organized so that the interrupts triggered by the communicating speech processing circuits and the recorder are treated from their respective appearances within time intervals that are less than the duration of one granule. The order in which interrupts are processed is fixed dynamically as a function of the age of their respective appearances, and no interrupt is taken into account out of time since that would lead to sample crushing in the speech processing circuits.

By compressing the speech samples in each granule, it is possible to reduce both the transmission time to the recorder 17 on recording and the transmission time from the recorder to the speech processing circuits 18 on playback.

Naturally, temporary inactivity of the speech processing circuits 18 when they are not associated with a call facilitates access to the recorder for those circuits which are active since such inactivity reduces the number of interrupts that the control unit 23 needs to take into account.

Compressed speech samples are interchanged between the speech processing circuits 18 and the recorder via a direct memory access circuit included in the control unit 23, and it takes place via the buffer registers 35 and 36 and the disk controller 33 of the recorder 17.

Compressed speech sample data is recorded by choosing a logical organization for message data blocks on the disk and for data transfer conditions to or from the disks, and by choosing a hardware architecture for the disk controller and disk unit assembly, with all of the choices being designed to obtain very high speed access.

To this end, the disk controller 33 is selected to be a low level controller so as to provide control over all of the time intervals required for transferring data with the disks, and disk controller controlling all of the disk units 32 in the present case and being constituted by a standardized ST506 type controller, for example.

Figure 3:
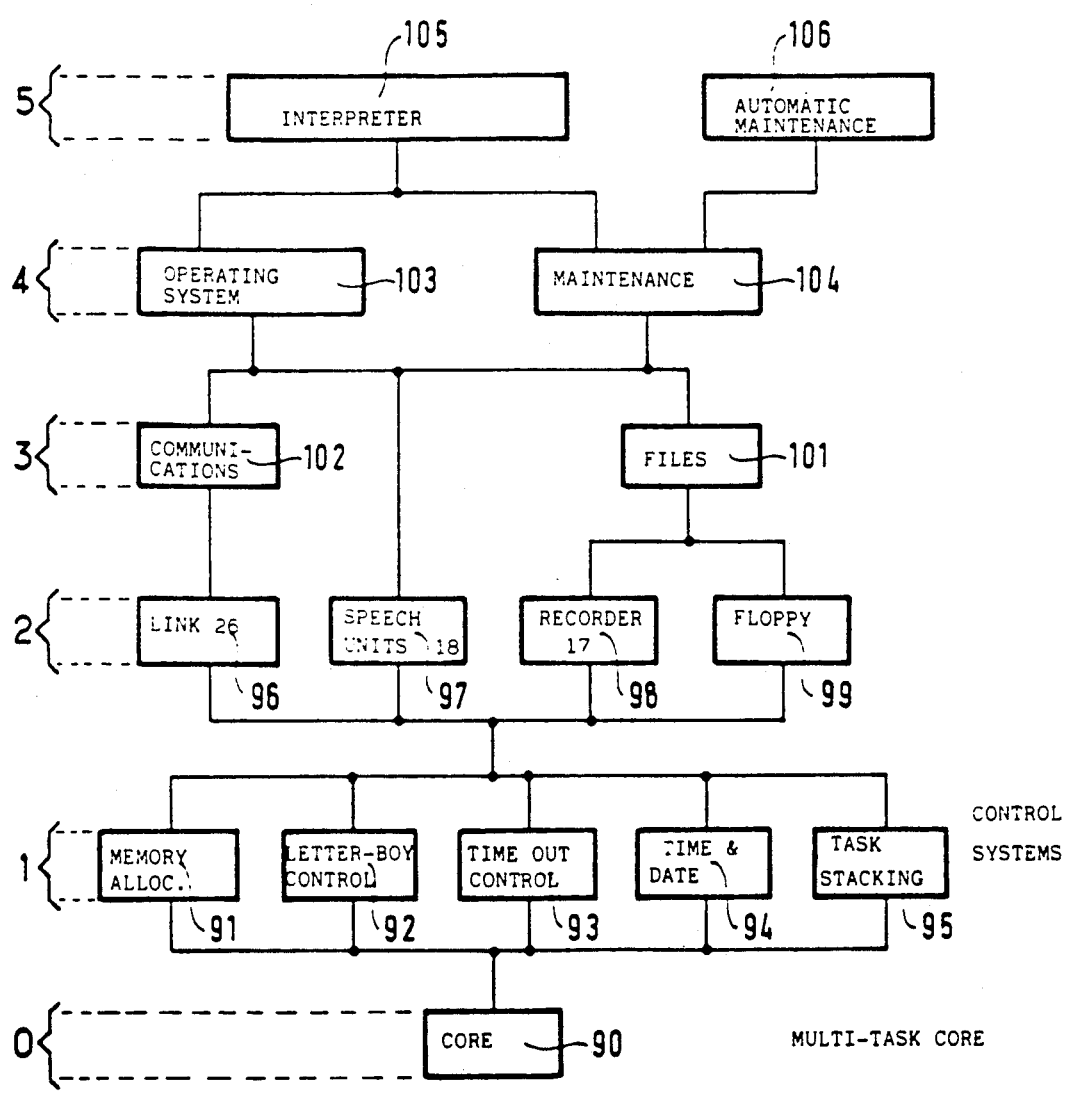
FIG. 3 is a diagram showing how the software relating to the voice message application of an exchange is divided up.

The software organization required for operating the voice message equipment is briefly outlined in FIG. 3, and in this case there are six levels.

Level zero is constituted by a conventional real time multitasking kernel 90 which is provided in as simple a form as possible.

Level 1 comprises a plurality of control systems 91 to 95. Control system 91 allocates memory zones, control system 92 provides software control for specialized inter-task communication voice letterboxes.

Control system 93 provides software control of various time limits. Control system 94 time-and-date stamps messages. Control system 95 controls task stacking, and is particularly intended to avoid overloading such stacks.

Input/output level 2 comprises a system 96 for controlling the link 26, a system 97 for controlling the speech processing cards, a system 98 for controlling the recorder, and optionally a system 99 for controlling floppy disks. The control system 98 for the recorder is common to various different disk units 32 and is concerned with transfers and positions of the blocks of data in the messages on the various different disks, and in particular it puts them into order of each of the disks, being organized to reduce the number of inter-task context switches required, thereby providing system time savings. Operation at the level of control system 98 have priority and its requests the place in priviledge mode without interrupts that could cause the system to lose control temporarily.

Level 3 includes a system 101 for controlling files to organize the logical allocation of messages on each disk and which has access to control systems 98 and 99. It also includes a communications handler 102 for supervising inputs and outputs and therefore having access to the system for controlling the link 96.

Level 4 includes an operating system program 103 and a maintenance program 104. The tasks of the operating program 103 are essentially subdivided in this case into "n" identical operating tasks each associated with one call and and consequently with one time slot of hte multiplex link, together with an operating task which serves in particular to delete messages.

Level 5 essentially comprises an interpreter 105 and an automatic maintenance program 106.

The interpreter 105 allocates incoming commands corresponding to requests made by users and which are transmitted via the control system 96 for the synchronous link 26 coming from the unit 24.

In the intended application, users having telephones connected to the exchange including the voice message equipment have the option of having calls to their telephones redirected to the voice message equipment. These users may have individual letterboxes or shared letterboxes for receiving messages intended for them and coming from any other telephone in the network which includes the exchange, and also for forwarding messages recorded in said letterboxes for them by other parties and possibly also by themselves for forwarding to other parties, in particular to any incoming caller.

A telephone set satisfying the conditions required for obtaining a letterbox may have a letterbox allocated thereto by the "application" control unit 24 with the characteristics of the letterbox being stored in backed-up static working memory accessible by said unit. These characteristics include, for example, an allocation code specific to a telephone set, the number of messages stored at a given moment of consultation, together with their references, the type of operation allowed, the operation currently taking place, etc. By using static memory which is directly connected to the application control unit 24 via a bus it is possible to enhance the speed with which the unit has access to information relating to telephone sets having letterboxes associated therewith as required both for recording and for playing back messages.

Any message recording, playback, or erase operation performed by a user from a telephone set requires the calling telephone set to be put into communication with the voice message equipment 1 via the switching network 2 whenever the calling party makes a call to said equipment either directly or indirectly. The call may be a specific telephone-to-equipment call, e.g. by pressing on a special button or by dialing a special code, particularly if the telephone has it own letter-box in the voice message equipment 1, however the call may also be a conventional telephone-to-telephone call while the called telephone is having its calls redirected to the voice message equipment.

In these various cases, the control system 7 of the exchange communicates with the application control unit 24 of the voice message equipment 1 via the link 27 if the message equipment is accessible and for the purpose of putting the caller into communication with a letterbox to which the called telephone number gives access, should that be required.

The application control unit 24 then takes account of the operating characteristics of the letterbox in question and interrogates the control unit 23 in order to cause a speech processing circuit 18 to be associated temporarily with a time slot in the frame of the time division multiplex link 19, and consequently with link 14 or 16, with the identity thereof being transmitted for this purpose by the control system 7. The availability of a free speech processing unit 18 is signaled to the application control unit 24.

The application control unit 24 then informs the control system 7 of the exchange that a unit is available, thereby causing a path to be established through the switching network between the caller and the speech processing circuit.

Simultaneously, the application control unit 24 takes account of the type of action to be performed in order to implement the corresponding menu, said actions corresponding, for example, to recording from a telephone set to which a letterbox is allocated, to recording from a telephone set calling the telephone having a letterbox allocated thereto, to playing back messages contained in the letterbox to an authorized user, to erasing a message, etc.

In these various cases, the application control unit 24 defines the menu to be applied for satisfying the current request, and also issues various audible guides in the form of tones or recorded messages for transmission to the caller in order to obtain the desired result.

This takes place in communication with the control processor 45 of the speech processing circuit 18 concerned and via the control unit 23 for establishing transmission on the time slot connecting said speech processing circuit to the calling telephone.

The audible guide includes one or more audible messages inviting the caller to act in accordance with a process known to the caller or explained to the caller, e.g. by sending a multifrequency code from a telephone set or by sending a sound message to be recorded.

The control unit 23 establishes a descriptor for each new message for the purpose of creating the finding the message on the disk of the recorder 17 where the speech samples constituting it are recorded.

To this end, it looks for available descriptor location on the descriptor card of one of the available disks, as a function of the memory volume on the corresponding card for the compressed speech samples of the message on the disk.

For reasons of speed of access, the choice of a disk for recording a new message takes account of the number of accesses already in progress on each of the available disks at the instant the choice is made and also of the extent to which each of them is full so as to select the least full disk with the least heavily loaded access.

This is facilitated by the fact that the driver software system in the control system 98 is common for the various different disk units which it controls and supervises via the file control system 101 which receives its instructions from the individual operating tasks.

The granules of message speech samples (as compressed, for example by a factor of four or six, and as transmitted in succession to or from the recorder 17) are located in disk sectors that are not necessarily adjacent, for reasons both of speed of access and of order of appearance.

As a result, each message descriptor containing identification data relating to its individual identity, its type, its state, its length, and its date, also contains a table showing the locations of the accompanying message granules. The descriptor also includes pointers for defining the positions of the last granule written, of the next granule to be written, and of the last usable granule.

The corresponding descriptor references are then transmitted from the control arrangement 22 after the corresponding message has been recorded. The control unit 24 stores these descriptor references in the corresponding letterbox to enable messages to be mentioned to authorized users seeking to read a letterbox containing the messages and to enable the messages to be played back, i.e. to enable a message as defined to be read.

Messages are read in a manner comparable to that described above for recording, with the recorder then transmitting granules to the selected speech processing circuit for decompression and transmission over the pre-established time slot of the time division multiplex link 19 to an authorized user requesting playback, via the switching network 2 and the user's telephone set.

The same applies to deleting recorded messages which takes place under similar conditions on the request of the letterbox owner or on the request of the organization running the telephone exchange should that be necessary.

We claim:

1. Voice message equipment for telephone sets (3, 4) connected to an automatic exchange including a switching network (2) for putting said sets into communication with one another and possibly with other telephone sets connected to other exchanges in a network having exchanges interconnected by telephone lines (6), said equipment being intended to enable the telephone sets to be put into communication with one another in deferred manner via the switching network (2) by means of a recorder (17) included in said equipment and provided with at least one memory disk unit (32) for recording messages for deferred retransmission, the equipment being characterized in that said equipment includes interconnection means (18, 22) for putting a plurality of different telephone sets simultaneously into communication with a disk controller (33) of the recorder for simultaneously transmitting messages both from the telephone sets (3, 4) to the recorder and from at least one disk unit (32) to at least one of said telephone sets, said interconnection means having compressing means for cyclically compressing a determined number of speech samples transmitted successively in a given time interval "T" by a time slot of a time division multiplexed link (19) via which the switching network (2) has access to the equipment, into a corresponding group of granule samples, and for transmitting said group as a block over a shard link to said recorder within a time shorter than the group formation time after it has itself been formed, said shared link being shared for transmission to said recorder of other groups coming from other time slots of the time division multiplexed link (19) and for retransmission of other groups from said recorder, and secondly decompressing each group as retransmitted by the recorder into a succession of speech samples and transmitting such a succession over a time slot of the time division multiplexed link (19) to a telephone set via the switching network (2), for an exchange provided with a control system (7) associated with a set of memories (8) and organized around at least one processor, the equipment being characterized in that it includes a programmed control arrangement (22), connected to said interconnection means, for storing and reproducing and operating on messages transmitted to the recorder (17), for recognizing requests for recording and for retransmitting messages, and in that the control software is split into a plurality of levels (0 to 5) in which the extreme levels include a conventional multi-tasking kernel (90) at one extreme and at least one interpreter (105) at the other extreme, said software including a recorder control system (98) common to the various different disk units.

2. Voice message equipment for telephone sets (3, 4) connected to an automatic exchange including a switching network (2) for putting said sets into communication with one another and possibly with other telephone sets connected to other exchange in a network having exchanges interconnected by telephone lines (6), said equipment being intended to enable the telephone sets to be put into communication with one another in deferred manner via the switching network (2) by means of a recorder (17) included in said equipment and provided with at least one memory disk unit (32) for recording messages for deferred retransmission, the equipment being characterized in that said equipment includes interconnection means (18, 22) for putting a plurality of different telephone sets simultaneously into communication with a disk controller (33) of the recorder for simultaneously transmitting messages both from the telephone sets (3, 4) to the recorder and from at least one disk unit (32) to at least one of said telephone sets, said interconnection means having compressing means for cyclically compressing a determined number of speech samples transmitted successively in a given time interval "T" by a time slot of a time division multiplexed link (19) via which the switching network (2) has access to the equipment, into a corresponding group of granule samples, and for transmitting said group as a block over a shared link to said recorder within a time shorter than the group formation time after it has itself been formed, said shared link being shared for transmission to said recorder of other groups coming from other time slots of the time division multiplexed link (19) and for retransmission of other groups from said recorder, and secondly decompressing each group as retransmitted by the recorder into a succession of speech samples and transmitting such a succession over a time slot of the time division multiplexed link (19) to a telephone set via the switching network (2), characterized in that the means for putting telephone sets into communication with the disk controller (33) of the recorder includes a plurality of speech processing circuits (18), connected between the disk controller and the telephone sets, each firstly for compressing samples coming from a time slot of the time division multiplexed link to which they are connected in parallel, and secondly for decompressing each group as successively reproduced by the disk controller (33) and coming from a disk unit (32) for a given message to be sent over a given time slot of the time division multiplexed link (19), further characterized in that said interconnection means for putting the telephone sets into communication with the disk controller (33) includes a programmed control arrangement (22) connected firstly to the disk controller (33) and to the speech processing circuit (18) by a data bus (25) giving the speech processing circuit direct access to the disk controller for storing and reproducing messages transmitted to the recorder (17) and connected secondly to a bus structure (9) serving the control system (7) of the exchange with which the voice message equipment is associated for recognizing requests for recording and playing back messages of the voice message equipment.

3. Voice message equipment according to claim 2, characterized in that each speech processing circuit (18) includes control means responsive firstly to synchronizing and clock signals, received from said exchange with which the voice message equipment is associated, and transmitted by the time division multiplexed link (19) and responsive secondly to the signals of the data bus (25), for controlling both the sending and the receiving of message speech samples both in series on a time slot of a said time division multiplexed link (19) and in parallel on the data bus (25) under the supervision of the control arrangement (22) of the equipment.

4. Voice message equipment according to claim 3, characterized in that the control means of each speech processing circuit (18) include a control signal processor (45) connected firstly to the time division multiplex link (19) by a two-way coupler and secondly to the data bus (25) via a register subassembly (54), said control signal processor (45) sharing in alternation with the control arrangement (22) of the equipment the control of the writing and reading in a pair of storage registers (35, 36) of same-time-slot speech samples transmitting to or received from the recorder (17).

5. Voice message equipment according to claim 4, characterized in that each speech processing circuit also includes a compressing signal processor (47) both for compressing speech samples from a time slot for the purpose of compacting them in groups prior to transmitting them to the disk controller (33) and for decompressing samples arriving in a block from a disk unit (32) via the disk controller prior to applying them to a time slot of the multiplex link (19).

6. Voice message equipment according to claim 4, characterized in that the control processor (45) of a speech processing circuit is programmed to detect multifrequency keypad signaling transmitted over a time division multiplexed link time slot by a telephone set which is in communication with the equipment, and to inhibit onward transmission of said signaling beyond the storage registers (35, 36).

7. Voice message equipment according to claim 5, characterized in that the control processor (45) of a speech processing circuit is programmed to provide dynamic gain control on the speech samples coming from a time slot in the multiplex link (19) prior to their being compressed by the compressing processor (47) in such a manner as to put said signals into a given range prior to their compressions for the purpose of being recorded by a disk unit (32).

8. Voice message equipment according to claim 2, characterized in that the control arrangement (22) thereof comprises two control units (23, 24) each organized about a processor, one of said control units (23) being a managing unit and being connected firstly to the other control unit (24) and secondly to the speech processing circuits (18) and to the disk controller (33) via the data bus (25) to store and reproduce messages transmitted to the recorder (17), the other control unit (24) being an application unit and being connected to the bus structure (9) via a coupler (13) for recognizing requests for recording messages and for retransmitting them.

9. Voice message equipment according to claim 2, characterized in that the control arrangement (22) includes a backed-up workng memory for storing information relating to letterboxes allocated to authorized users for their messages.

* * * * *